April 13, 1971     A. A. FOURNIER     3,574,667
THERMOPLASTIC ADHESIVE SHEET
Filed Jan. 5, 1968
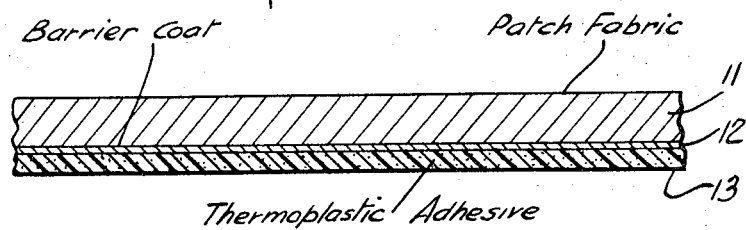
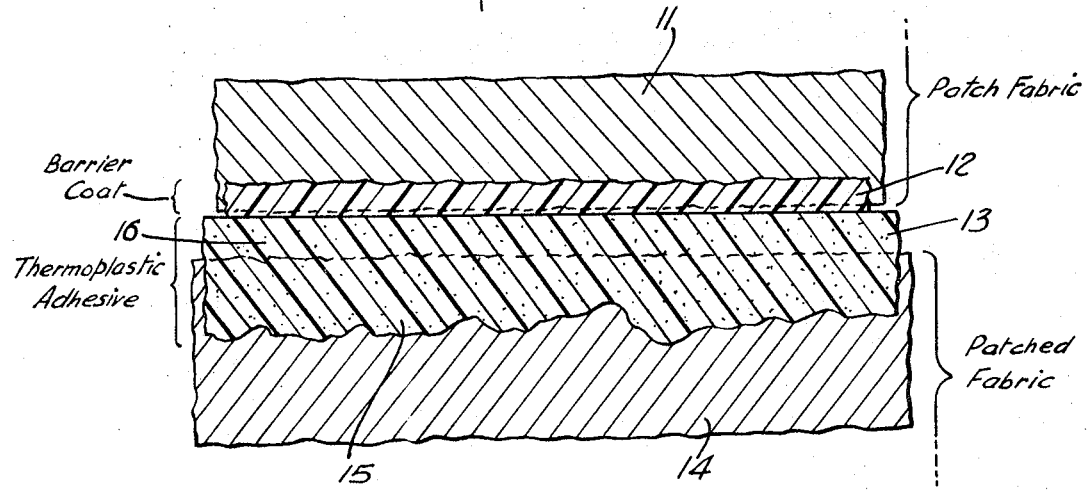
INVENTOR
ALBERT A. FOURNIER
Charles A. Harris
ATTORNEY 3,574,667
THERMOPLASTIC ADHESIVE SHEET
Albert A. Fournier, Martinsville, N.J., assignor to
Johnson & Johnson
Filed Jan. 5, 1968, Ser. No. 695,938
Int. Cl. C09j 7/04
U.S. Cl. 117—76
6 Claims

ABSTRACT OF THE DISCLOSURE

An iron-on adhesive sheet comprising a flexible backing sheet, and a normally non-tacky layer of a thermoplastic adhesive applied to one major surface of said backing. The adhesive comprises about 100 parts of a relatively low softening point, relatively low molecular weight polar vinyl chloride copolymer, about 40-80 parts of a monomeric plasticizer for said copolymer, about 30-50 parts of relatively high softening point, unfused relatively high molecular weight vinyl chloride polymer particles, and about 40-60 parts of a polymeric plasticizer for said high molecular weight polymer. Preferably, a vinyl barrier layer is applied between the backing sheet fabric and the adhesive layer.

---

The present invention relates to normally non-tacky thermoplastic adhesive sheets of the type which is adapted to be adhered to other sheets by the application of heat and pressure, more particularly to such thermoplastic sheets which are used as iron-on patches for repairing clothing and the like.

This type of thermoplastic iron-on sheet or patch is applied to a porous fabric to be repaired by ironing. This means that heat and pressure are applied to the adhesive layer of the sheet which is in contact with the fabric through a hot iron pressed down upon the top surface of the sheet. Since the sheet or patch, itself, normally is based upon a fabric the same as, or similar to the fabric to be repaired, the heat from the iron is transmitted from the hot iron through the patch fabric before it can affect the adhesive layer. Since the ironing time is relatively brief, the temperature in the adhesive layer will never reach that of the iron. With normal ironing temperatures in the neighborhood of 350° F., this means that the thermoplastic adhesive must be capable of flowing fairly easily at temperatures substantially below 350° F. in order to assure the adhesive will sink into the fabric below and form the desired bond between the patch and the fabric. Furthermore, since modern synthetic fabrics and finishes require even lower ironing temperatures, patches made from such fabrics must be based on adhesives which flow at even lower temperatures.

On the other hand, if the adhesive flows too easily or at too low a temperature, it will soften too much at the washing and drying temperatures of the repaired fabric to resist the high mechanical forces which are generated during these processes. As a result, the patch comes off. Thus, there has been thought to be a basic dilemma between choosing an adhesive possessing high enough flow characteristics at the ironing temperatures to assure a firm bond between the patch and the repaired fabric, on the one hand, and an adhesive which possesses a high enough post bonding softening temperature to assure that the bond between the adhesive and the patched fabric will not fail at the temperatures employed during washing or drying.

I have discovered taht this problem is not nearly as simple as it seems in that one of the major reasons for patch failure under these conditions is that the adhesive may flow too completely into the interstices of the patched fabric. As a result, the interface between the adhesive layer and the fabric backing of the patch becomes "starved" and develops rigidity and therefore fails during mechanical flexure of the fabric during the high tumbling forces generated during washing and/or drying. Another way of putting this is that it is highly desirable and in fact necessary for best results to leave an integral film of the flexible thermoplastic adhesive remaining between the repaired fabric and the more rigid fabric backing sheet of the patch, itself. This film should have sufficient thickness to provide the necessary flexibility in the resulting structure. While theoretically one can conceive of selecting just the right ironing temperature, pressure and time to assure that this result is obtained, it is virtually impossible to do so in practice for obvious reasons. This problem is accentuated by the fact that prior art thermoplastic adhesives used for this purpose begin to soften and flow slowly as they are heated under the pressure of the iron and then suddenly flow much more rapidly as the adhesive becomes fluid. Above a certain point, the rate of increase in the fluidity of the adhesive with increases in temperature is so great that it is extremely difficult to prevent the adhesive from flowing completely into the interstices of the repaired fabric and thereby "starve" the interface between the adhesive and the fabric of the patch.

Summarizing the above, the patch may fail in any one of several ways. As indicated, the bond between the adhesive and the repaired fabric may fail or the patch may fail at the interface between the thermoplastic adhesive and the patched fabric, itself. Theoretically, the strength of the bond between the adhesive and the repaired fabric may be increased more easily by using an adhesive which possesses a high softening point as the patch is ironed on. However, since such adhesives normally also possess high initial softening points, this approach does not solve the problem of providing patches which may be applied at lower ironing temperatures. Furthermore, since I have discovered that the most important factor may well be the mechanical strength of the patch at the interface between the adhesive and the fabric of the patch, it appears that other factors are important in the solution of this problem.

I have invented an iron-on adhesive sheet or patch which solves the problems referred to above. It is based upon a thermoplastic adhesive which, on the one hand possesses increased mechanical and chemical bonding characteristics with respect to the repaired fabric; and on the other hand possesses controlled flow characteristics which assure that an adequate film of the flexible adhesive remains between the repaired fabric and the fabric of the patch after the patch has been ironed on, even at the low temperatures necessary to insure against damage to modern synthetic fabrics and finishes.

For this purpose, I have developed an iron-on adhesive sheet which comprises a thermoplastic adhesive layer which is based upon a two-phase system; one of which possesses relatively high flow characteristics at lower temperature, as well as high chemical bonding characteristics, while the other contributes controlled flow at the temperatures where such adhesives normally are highly fluid and also contributes increased strength to the adhesive layer, itself. The two-phase adhesive system of my invention comprises a relatively low softening point, relatively low molecular weight polar vinyl chloride copolymer together with about 40-80 parts of a monomeric plasticizer for this copolymer, as the elements making up one phase of the system; and about 30-50 parts of a relatively high softening point, unfused relatively high molecular weight vinyl chloride polymer together with about 40-60 parts of a polymeric plasticizer, therefore, as the elements making up the other phase of the system. Whenever proportions are given in parts anywhere in this application, it shall mean parts per one hundred parts of the relatively low molecular weight copolymer of the adhesive of this invention, unless otherwise indicated. Preferably, the adhesive comprises at least about as many parts of monomeric plasticizer as polymeric plasticizer and at least about as many parts polymeric plasticizer as high molecular weight resin.

The low molecular weight copolymer is dissolved with the monomeric plasticizer in a suitable solvent or solvent mixture for the particular copolymer and plasticizer used, and the high molecular weight polymer is dispersed in particle form in the polymeric plasticizer. The dispersion then is added to the solution to form an intimate mixture of said dispersed high molecular weight polymer and polymeric plasticizer and the said dissolved low molecular weight copolymer and monomeric plasticizer, and the mixture is coated on the patch fabric and dried at a temperature well below the fusing temperature of the high molecular weight polymer to provide the desired unfused thermoplastic adhesive layer. I have determined that, when the low molecular weight polar copolymer and the high molecular weight polymer and their respective monomeric and polymeric plasticizers are combined in the adhesive in the proportions indicated above, the iron-on sheets and patches formed therewith may be bonded very effectively to many different types of fabrics at relatively low temperatures and yet may be subjected to modern washing and drying cycles without significant bond failures.

Although the exact mechanism by which the adhesive system of my invention operates is not known, it is believed that the relatively high molecular weight vinyl polymer particles remain associated with or, in a sense, individually surrounded by the high molecular weight polymer in the unfused adhesive. At any rate, the high molecular weight polymer remains substantially particulate or in a dispersed state until the fusion temperature of this polymer is reached, at which point it goes into solution with the polymeric plasticizer and the remainder of the adhesive system. It is obvious that certain other constituents may be included in relatively small quantities in the adhesive system for different reasons. For instance, solution stabilizers may be added. Preferably, the high molecular weight polymer dispersion also includes an aliphatic diluent.

The relatively low softening point, relatively low molecular weight polar vinyl chloride copolymer of this invention contain a minor amount of polar groups to enhance the chemical bonding characteristics of the adhesive with respect to the fabric to be repaired and preferably possesses an inherent viscosity generally in the range of 0.5–0.6. A preferred molecular weight polar copolymer in this category is the terpolymer of about 86 parts vinyl chloride, 13 parts vinyl acetate and 1 part maleic acid by weight of the total monomers, and having an inherent viscosity of about 0.5. This copolymer is offered by Union Carbide Corporation under the designation VMCH and is generally described more fully in U.S. Letters Pat. No. 2,329,456. Various monomeric plasticizers are suitable for use with the above described type of low molecular weight vinyl copolymer in the adhesive of this invention. Typical of these are di-octyl phthalate, di-iso-decyl phthalate, di-2-ethyl hexyl phthalate, and the like, preferably having a chain length of at least eight carbon atoms in the alcohol moiety.

The relatively high molecular weight vinyl polymer of the dispersion phase of the adhesive of this invention preferably possesses an inherent viscosity of at least about one. However, polymers having a somewhat lower inherent viscosity may be used. A preferred high molecular weight for this purpose is the copolymer of a vinyl chloride and a small percentage of maleic ester offered by Goodyear Tire and Rubber Company as Pliovic AO2 and having an inherent viscosity of about 1.05. Pliovic AO2 is the copolymer of vinyl chloride with about 4% by weight of the polymer of dibutyl maleate. The polymeric plasticizer suitable for use in the dispersion phase of the adhesive of this invention, of course is of an entirely different order of viscosity than the monomeric plasticizer. A preferred polymeric plasticizer which is particularly advantageous in the adhesive of this invention is the high molecular weight polyester offered by Union Carbide Corporation as Flexol R2H resin. Flexol R2H resin is a polyester of adipic acid and a glycol and has a number average molecular weight of about 2,000.

In the description up to this point, reference has been made to coating the adhesive onto the fabric of the patch as if it is to be coated directly onto the yarns, if the patch is based on a textile fabric, for instance. However, it is preferred, and normally is the procedure first to coat one side of the patched fabric with a barrier layer to close the interstices adjacent the surface on which the adhesive is to be coated. Of course, no barrier layer is needed if the adhesive is to be applied to a substantially non-porous patch sheet or fabric. However, normally the fabric of the patch would be a porous textile corresponding to the fabric to be repaired. It is preferred that the barrier layer consist predominately of a vinyl polymer film former having a softening point substantially higher than that of the low molecular weight vinyl copolymer of the adhesive.

A typical vinyl polymer suitable for this purpose is the copolymer of vinyl chloride with approximately 2 or 3 percent vinyl acetate, which is offered by Union Carbide Corporation under the designation VYNW–5. This material has an inherent viscosity of about 1.07. Generally speaking, the barrier layer film former is applied to the patched fabric at a dried coated weight of between about 0.4–0.65 ounce per square yard. This material, for the most part, is absorbed into the interstices of the patched fabric adjacent to the surface on which it is applied. The adhesive mixture, then, is applied over the barrier layer at a coating weight arranging between 2.5–4.2 dry ounces per square yard. In general, both the barrier layer and the adhesive layer are applied at lower weights when coated on finer fabrics such as broadcloths and at heavier weights when applied to coarser fabrics such as denims, twills, and the like.

Other and further advantages of this invention will appear to one skilled in the art from the following description, examples and claims taken together with the drawings wherein:

FIG. 1 is an enlarged schematic sectional view through an iron-on adhesive sheet according to this invention.

FIG. 2 is a much more greatly enlarged schematic sectional view showing a portion of the iron-on sheet of FIG. 1 after it has been applied to or ironed-on to a porous fabric to be repaired.

Referring to the drawings, there is shown an iron-on adhesive sheet according to one embodiment of this invention which comprises a porous patch fabric backing sheet 11, a barrier layer 12 applied to one major surface of the patch fabric 11, and a somewhat thicker thermoplastic iron-on adhesive layer 13 of this invention coated over the barrier layer 12.

FIG. 2 illustrates the extent to which the film former of the barrier layer 12 sinks into the interstices of the patch fabric 11, as well as the extent to which the adhesive 13 sinks into the interstices of the repaired fabric 14, while remaining in film form between the repaired fabric and the barrier coated fabric of the patch. It also will be seen from the drawings that the barrier layer 12 normally is relatively thin when compared to the adhesive layer 13, as has been described hereinbefore. It will be seen from FIG. 2 that when the patch is ironed on to the fabric 14 to be repaired, the adhesive penetrates extensively into the interstices of the patched fabric as shown by the portion 15 of the adhesive below the dotted line outline of the top surface of the fabric 14. However, it also will be seen that an appreciable amount of the adhesive remains in the form of an integral film 16 between the top surface of the patched fabric and the bottom surface of the barrier layer 12, thereby contributing flexibility to the resulting structure and minimizing the likelihood of patch failure at the interface between the adhesive and the remainder of the patch.

The following examples further illustrate typical embodiments of this invention. However, my invention should, of course, not be construed as limited thereto.

EXAMPLE I

A porous woven denim fabric weighing about 7 ounces per square yard is coated on one of its major surfaces with the following thermoplastic vinyl film forming formulation.

| Material: | Parts per 100 parts vinyl film former |
|---|---|
| Vinyl film former (VYNW-5) | 100 |
| Dioctyl phthalate | 88 |
| Toluene | 470 |
| Methyl ethyl ketone | 378 |
| Epoxy stabilizer | 3.8 |

The coated fabric is then dried to remove the solvents and give a vinyl barrier layer weighing about 0.6 ounce per square yard which effectively fills the interstices at the surface of the fabric to which it is applied. The VYNW-5 film former is the Union Carbide Corporation product referred to hereinbefore.

A heat-sealing adhesive formulation of this invention is produced as follows. First, the following constituents are combined to form a true solution with a relatively low molecular weight polar vinyl copolymer and monomeric plasticizer of this invention.

| Material: | Parts |
|---|---|
| Low molecular weight vinyl copolymer (VMCH) | 100 |
| Di-isodecyl phthalate (monomeric plasticizer) | 60 |
| Toluene | 165 |
| Methyl isobutyl ketone | 40 |
| Methyl ethyl ketone | 80 |
| Propylene oxide stabilizer | 2 |

To this solution is added the following dispersion of high molecular weight vinyl polymer particles in a polymeric plasticizer of this invention.

| Material: | Parts |
|---|---|
| High molecular weight vinyl polymer (Pliovic AO2) | 36 |
| Polymeric plasticizer (Flexol R2H) | 54 |
| Aliphatic diluent | 10 |

The vinyl polymers and the polymeric plasticizers used in the above formulations all have been identified and described hereinbefore.

An intimate mixture is formed between the above dispersion and solution and the mixture then is coated over the barrier layer and dried at about 270° F., substantially below the fusing temperature of the high molecular weight polymer, to provide an adhesive layer weighing about 4.0 ounces per square yard. When patches cut from this adhesive coated fabric are ironed-on to a denim fabric to be repaired which has been pre-coated with a temperature sensitive Koratron synthetic finish, an excellent bond is obtained between the patch and the repaired fabric which remains intact even when subjected to repeated washings and dryings in automatic equipment which employs high tumbling forces.

EXAMPLES II AND III

The barrier coated fabric of Example I is coated with two adhesive formulations which also are the same as the adhesive of Example I with the exception that the proportions of high molecular weight polymer and polymeric plasticizer of the dispersion phase are varied as follows:

| Material | Parts II | III |
|---|---|---|
| Pliovic AO2 polymer | 39.7 | 43.1 |
| Flexol R2H plasticizer | 49.7 | 46.5 |

The resulting fabrics are dried, cut into patches, and ironed-on to similar textile fabrics, as described in Example I, to again provide bonds which resist the most extreme temperatures and tumbling forces without sign of failure.

Having now described the invention in specific detail and exemplified the manner in which it may be carried into practice, it will be readily apparent to those skilled in the art that innumerable variations, applications, modifications and extensions of the basic principles involved may be made without departing from its spirit or scope.

What is claimed is:

1. An iron-on adhesive sheet which comprises a flexible backing sheet; and a normally non-tacky layer of a thermoplastic adhesive applied to one major surface of said backing sheet; the active ingredients of said thermoplastic adhesive consisting essentially of about 100 parts of a relatively low softening point, relatively low molecular weight polar vinyl chloride copolymer having an inherent viscosity generally in the range of 0.5–0.6, said copolymer being in solution with about 40–80 parts of a monomeric plasticizer, about 30–50 parts of relatively high softening point, unfused relatively high molecular weight vinyl chloride copolymer particles having an inherent viscosity of at least about one, and about 40–60 parts of a polymeric polyester plasticizer for said high molecular weight polymer, said high molecular weight polymer particles being in dispersion with said polymeric plasticizer and said dispersion being intimately mixed with said low molecular weight copolymer and said monomeric plasticizer.

2. An iron-on adhesive sheet according to claim 1, wherein said adhesive comprises at least about as many parts of monomeric plasticizer as polymeric plasticizer and at least about as many parts polymeric plasticizer as high molecular weight resin.

3. An iron-on adhesive sheet according to claim 1, wherein said low molecular weight copolymer is a terpolymer of vinyl chloride, vinyl acetate and maleic acid.

4. An iron-on adhesive sheet according to claim 3, wherein said high molecular weight polymer is a copolymer comprising a large proportion of vinyl chloride and a small proportion of a maleic acid ester.

5. An iron-on adhesive sheet, according to claim 1, wherein said backing sheet comprises a porous backing fabric and a barrier layer of a thermoplastic film former coated on the backing fabric to block its interstices adjacent the surface to which the adhesive layer is applied.

6. An iron-on adhesive sheet, according to claim 5, wherein the thermoplastic film former comprises a vinyl polymer having a softening point substantially higher than that of the relatively low molecular weight polymer of the adhesive.

References Cited

UNITED STATES PATENTS

| | | | |
|---|---|---|---|
| 2,101,607 | 12/1937 | Block | 117—122X |
| 2,853,404 | 9/1958 | Weinberg | 117—122 |
| 3,137,666 | 6/1964 | Lox et al. | 117—161X |
| 3,336,152 | 8/1967 | Garden | 117—122UX |
| 3,471,315 | 10/1969 | Böe et al. | 117—122X |

WILLIAM D. MARTIN, Primary Examiner

B. D. PIANALTO, Assistant Examiner

U.S. Cl. X.R

117—3.4, 122, 161; 260—899